(12) United States Patent
Raoufat et al.

(10) Patent No.: US 12,080,837 B2
(45) Date of Patent: Sep. 3, 2024

(54) POWER MANAGEMENT CONTROL

(71) Applicant: Bloom Energy Corporation, San Jose, CA (US)

(72) Inventors: Ehsan Raoufat, San Jose, CA (US); Ali Zargari, San Jose, CA (US); Julio Luna, San Jose, CA (US); Alireza Saeedmanesh, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/155,147

(22) Filed: Jan. 17, 2023

(65) Prior Publication Data

US 2023/0253598 A1    Aug. 10, 2023

Related U.S. Application Data

(60) Provisional application No. 63/299,902, filed on Jan. 14, 2022, provisional application No. 63/299,910, filed on Jan. 14, 2022, provisional application No. 63/299,898, filed on Jan. 14, 2022, provisional application No. 63/299,892, filed on Jan. 14, 2022.

(51) Int. Cl.
| | |
|---|---|
| *H01M 8/12* | (2016.01) |
| *C25B 1/04* | (2021.01) |
| *C25B 15/021* | (2021.01) |
| *C25B 15/027* | (2021.01) |
| *G05D 23/19* | (2006.01) |
| *G05D 23/30* | (2006.01) |
| *H01M 8/04701* | (2016.01) |

(52) U.S. Cl.
CPC ............... *H01M 8/12* (2013.01); *C25B 1/04* (2013.01); *C25B 15/021* (2021.01); *C25B 15/027* (2021.01); *G05D 23/19* (2013.01); *G05D 23/1951* (2013.01); *G05D 23/30* (2013.01); *H01M 8/04701* (2013.01); *H01M 2008/1293* (2013.01)

(58) Field of Classification Search
CPC .... G05D 23/19; G05D 23/1951; G05D 23/30; H01M 8/04701; H01M 2008/1293; H01M 8/12; C25B 1/04; C25B 15/021; C25B 15/027; C25B 15/087; C25B 1/042
See application file for complete search history.

(56) References Cited

U.S. PATENT DOCUMENTS

| | | |
|---|---|---|
| 2018/0331385 A1 | 11/2018 | Hickey et al. |
| 2021/0376361 A1 | 12/2021 | Dionne |
| 2022/0170388 A1* | 6/2022 | O'Donnell ............. B01D 53/62 |

FOREIGN PATENT DOCUMENTS

| | | |
|---|---|---|
| JP | 2020-128576 A | 8/2020 |
| WO | 2019058579 A1 | 3/2019 |

OTHER PUBLICATIONS

International Search Report & Written Opinion mailed Apr. 25, 2023 in corresponding PCT Application No. PCT/US2023/010907.

\* cited by examiner

*Primary Examiner* — Shogo Sasaki
(74) *Attorney, Agent, or Firm* — THE MARBURY LAW GROUP PLLC

(57) ABSTRACT

A controller for a solid oxide electrolyzer cell (SOEC) system, the controller being configured to receive a target operating temperature, receive a readback temperature value, and output a temperature setpoint command to each of a plurality of heaters.

16 Claims, 8 Drawing Sheets

POWER MANAGEMENT CONTROL

FIELD OF THE INVENTION

The embodiments of the present invention generally relate to solid oxide electrolyzer cell (SOEC) mechanical systems, steam use, power control, and associated safety systems.

BACKGROUND OF THE INVENTION

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) can be referred to as the air electrode, and the SOFC anode (SOEC cathode) can be referred to as the fuel electrode. During SOEC mode, water in the fuel stream is reduced ($H_2O \rightarrow 2e^- \rightarrow O^{2-}+H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY OF THE INVENTION

Accordingly, the present invention is directed to various power management control that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Values and ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X or +/−5% X. It will be further understood that the endpoints of each of the ranges are significant both in relation to the other endpoint, and independently of the other endpoint. The values and ranges provide examples, but the embodiments of the invention are not so limited.

Figure 1:
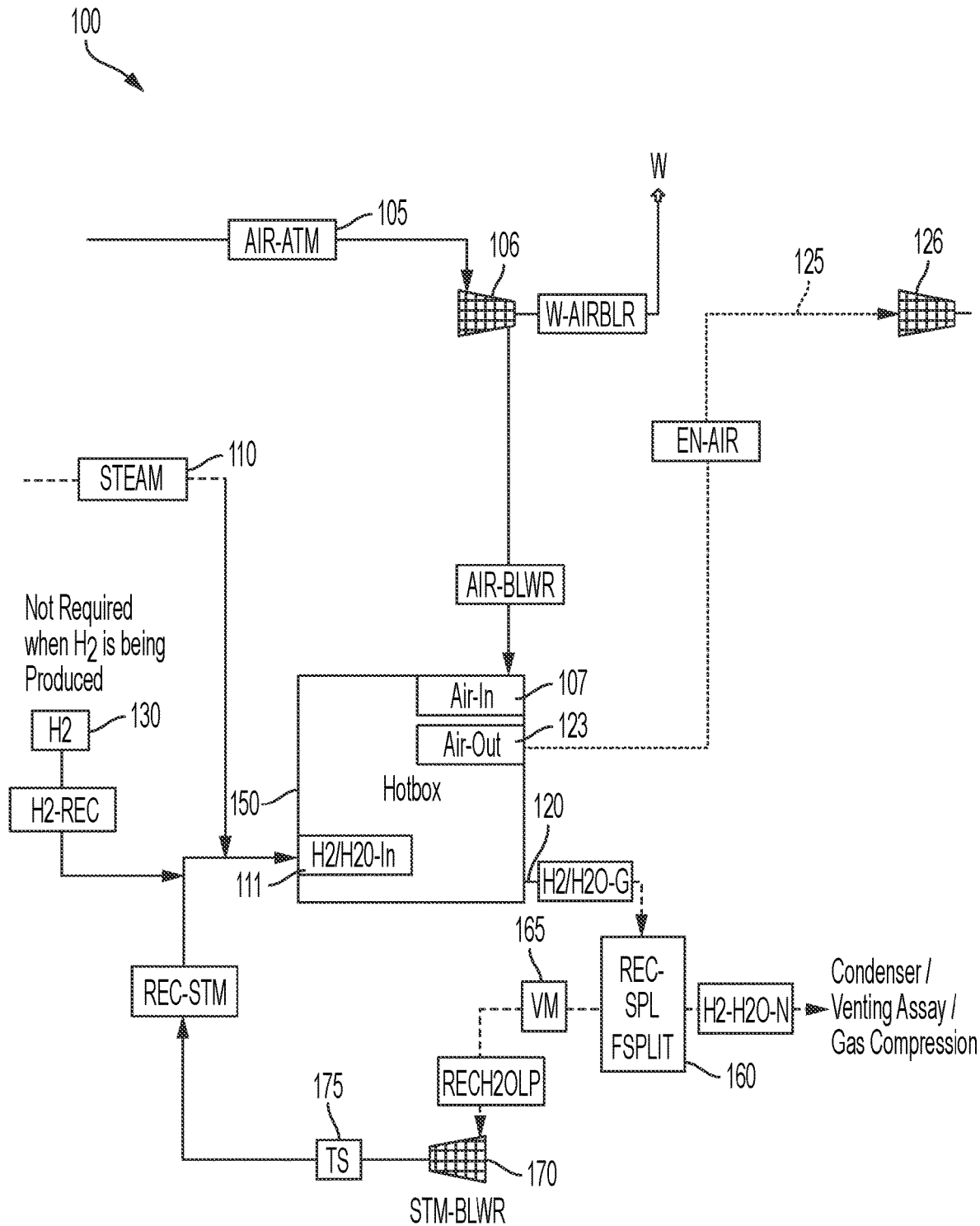
FIG. 1 is an SOEC system process flow diagram according to an example embodiment of the present invention.

FIG. 1 is an SOEC system 100 according to an example embodiment of the present invention.

As illustrated in FIG. 1, SOEC system 100 includes air conduit 105, air blower 106, air inlet 107, steam conduit 110, recycle steam inlet 111, hotbox 150, optional hydrogen conduit 130, enriched air outlet 123, enriched air conduit 125, enriched air blower 126, steam and hydrogen product outlet 120, splitter 160, Venturi flow meter 165, steam recycle blower 170, and thermal sensor 175.

According to an example configuration and operation, steam input at steam conduit 110 (e.g., supplying site or facility steam at varying pressures) can have a temperature of between about 100° ° C. and 110° C. (e.g., 105° C.) and a pressure of about 1 psig. In the various embodiments, steam may be input to the SOEC system 100 from an external source or may be generated locally. In some embodiments, multiple steam inlets may be configured to receive external and local steam, respectively. Alternatively, or additionally, water may be input to the SOEC system 100 and vaporized.

Air input (e.g., ambient air) at air conduit 105 may be ambient temperature, perhaps between about −20° C. and +45° ° C., at the local atmospheric pressure. Air from air conduit 105 is received at air blower 106, and air output by air blower 106 will be a slightly higher temperature than ambient due to the heat of compression. For example, the temperature of air output by air blower 106 may be about 30° C. at 1.0 psig as compared to 20° C. ambient air temperature. Air input of air conduit 105 is then received at air inlet 107 of hotbox 150.

Hydrogen from optional hydrogen conduit 130 may only be required for startup and transients when hydrogen is not being otherwise produced by SOEC system 100. For example, there is no longer a need for a separate hydrogen feed stream or hydrogen recycle steam at steady state. Pressure for this hydrogen stream is a design option determined at the time of site construction, and may be between about 5 psig and 3000 psig. The temperature is likely to be near ambient, as it is likely to be coming from storage.

Air input at air conduit 105, steam input at steam conduit 110, and hydrogen input at optional hydrogen conduit 130 are input to hotbox 150. In turn, hotbox 150 outputs steam and hydrogen product $H_2$—$H_2O$-G at steam and hydrogen product outlet 120 of hotbox 150, where G stands for Gross. Hotbox output $H_2$—$H_2O$-G may have a temperature between about 100° C. and 180° °C. (e.g., 130° C.), a pressure of between about 0.1 and 0.5 psig.

In addition, hotbox output $H_2$—$H_2O$-G is input to splitter 160 and is split into a steam recycle stream $RECH_2OLP$, where LP stands for low pressure, and a net product $H_2$—$H_2O$—N, where N stands for Net (e.g., output for commercial use or storage). Here, net product $H_2$—$H_2O$—N may have a temperature between about 100° C. and 180° C. (e.g., 130° C.), a pressure of between about 0.1 psig and 0.5 psig. Steam recycle stream $RECH_2OLP$ may have a temperature of between about 100° C. and 180° C. (e.g., 130° C.), a pressure of between about 0.1 psig and 0.5 psig. Hotbox 150 may further output enriched air at enriched air outlet 123 via enriched air conduit 125 that may have a temperature of between about 120° C. and 300° C., at essentially local atmospheric pressure (e.g., less than 0.5 psig or less than 0.05 psig).

Steam recycle stream $RECH_2OLP$ is input to steam recycle blower 170. The resulting recycled steam REC-STM may have a temperature of between about 100° C. and 180° C. (e.g., 140° C., 154° C.), a pressure between about 0.5 and 1.5 psig (e.g., about 1 psig), and is input into hotbox 150 at recycle steam inlet 111. In some embodiments, there may be no recycled hydrogen feed included with the recycled steam.

As can be understood from FIG. 1, incoming steam temperature at steam conduit 110 (e.g., 105° C.) is low compared with a SOEC configuration with internal steam generation. In various configurations, a plurality of recycle loops can be configured to SOEC systems using both internal steam generation and external steam generation. As shown, recycle steam inlet 111 is configured to receive steam from steam conduit 110. Here, the embodiments optionally route the facility supplied steam from steam conduit 110, typically saturated and at a temperature of about 105° C., through the internal steam generation coils, one or more vaporizers, and/or other heating elements, and use the air exhaust heat (e.g., ~280° C.) to further heat (i.e., superheat) the steam supply before the heat is released at enriched air conduit 125 through optional fan or enriched air blower 126.

Figure 2:
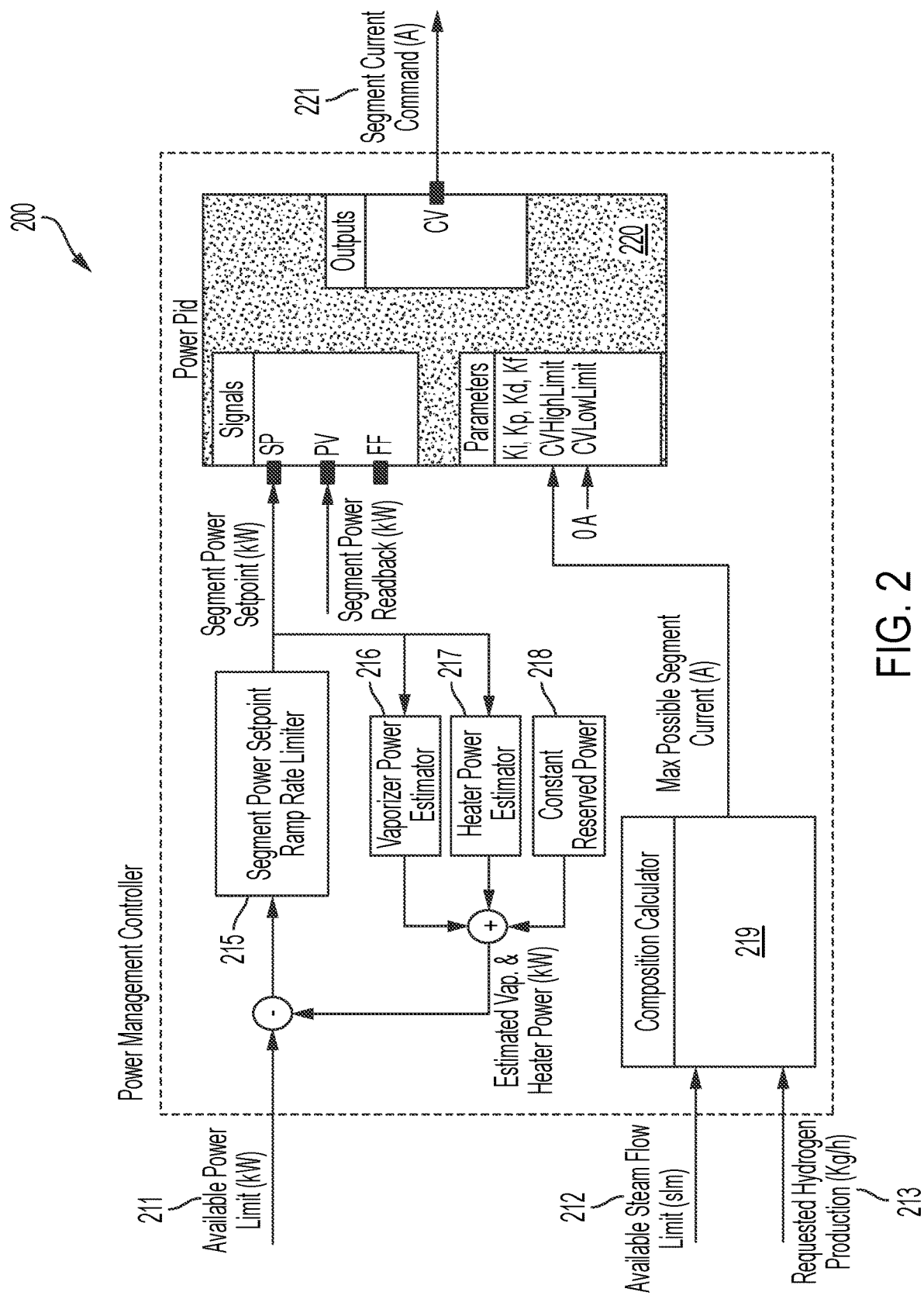
FIG. 2 illustrates a power management controller for SOEC system according to an example embodiment of the present invention.

FIG. 2 illustrates a power management controller 200 for SOEC system (e.g., 100) according to an example embodiment of the present invention.

Power management controller 200 is configured to receive inputs for available power limit (KW) 211, available steam flow limit (slm) 212, and requested hydrogen production (Kg/h) 213, as well as to output a segment current command 221 (Amps). Power management controller 200 operates the system at an optimal power level and hydrogen generation while satisfying different constraints such as limited available power 211, limited available steam 212, and requested hydrogen generation 213. Power management controller 200 executes to satisfy requested hydrogen production rate 213 while ensuring that power consumption is below available power limit 211 and steam flow consumption is below available steam flow limit 212.

Available power limit (KW) 211 is the maximum available power that the SOEC system is allowed to use at any time. Violation of available power limit 211 can result in tripping one or more protective devices (not shown). In some examples, available power limit 211 can be based on energy price, electric feeder limitations, intermittent renewable energy generation, coupling with an energy storage system with limited power rating, and the like.

Requested hydrogen production (Kg/h) 213 is a value that specifies the requested hydrogen production rate.

Available steam flow limit (slm) 212 is the maximum available steam for electrolysis. In case of steam flow limitation, the SOEC system can be configured to avoid operating regions where high steam flow is expected. Violation of available steam flow limit 212 can result in low temperature steam flow that could potentially damage the SOEC hotbox (e.g., hotbox 150). In some examples, available steam flow limit 212 can be due to limited water flow or limited thermal energy to generate steam.

The overall structure of power management controller 200 is shown in FIG. 2. Power management controller 200 receives inputs through external commands (e.g., 211, 212, 213). External command values are time dependent and can be varied during the operation of the system. Power management controller 200 achieves requested hydrogen production rate 213 while maintaining the available power limit 211 (i.e., consumed power limit) and available steam flow 212. For example, requested hydrogen production rate 213 can be set to a high value to operate the SOEC system based on available power limit 211 and available steam flow limit 212; or requested hydrogen production rate 213 can be set to a low value and limit the hydrogen generation.

As illustrated in FIG. 2, power management controller 200 includes segment power ramp rate limiter 215, vaporizer power estimator 216, heater power estimator 217, and constant reserved power 218 in a closed loop configuration. Power management controller 200 further includes composition calculator 219. The respective output of each of segment power ramp rate limiter 215 and composition calculator 219 is supplied to one or more power modules 220 (e.g., Power PID, proportional-integral-derivative modules).

Segment power ramp rate limiter 215 is used to ramp the segment power setpoint based on the remaining available power. Output of segment power ramp rate limiter 215 is sent to one or more power modules 220. Remaining available power is calculated as the available power limit minus the sum of the estimated vaporizer power, the estimated heater power, and the reserved power, as shown below.

Remaining Available Power=Available Power Limit− . . . (Est. Vaporizer Power+Est. Heater Power+Reserved Power)

Vaporizer power estimator 216 can be based on historical data. For example, a curve fitting approach is used to estimate the vaporizer power at different segment power levels (e.g., calculated indirectly using expected water flow). If historical data is unavailable, maximum vaporizer power can be used as the baseline.

Figure 3:
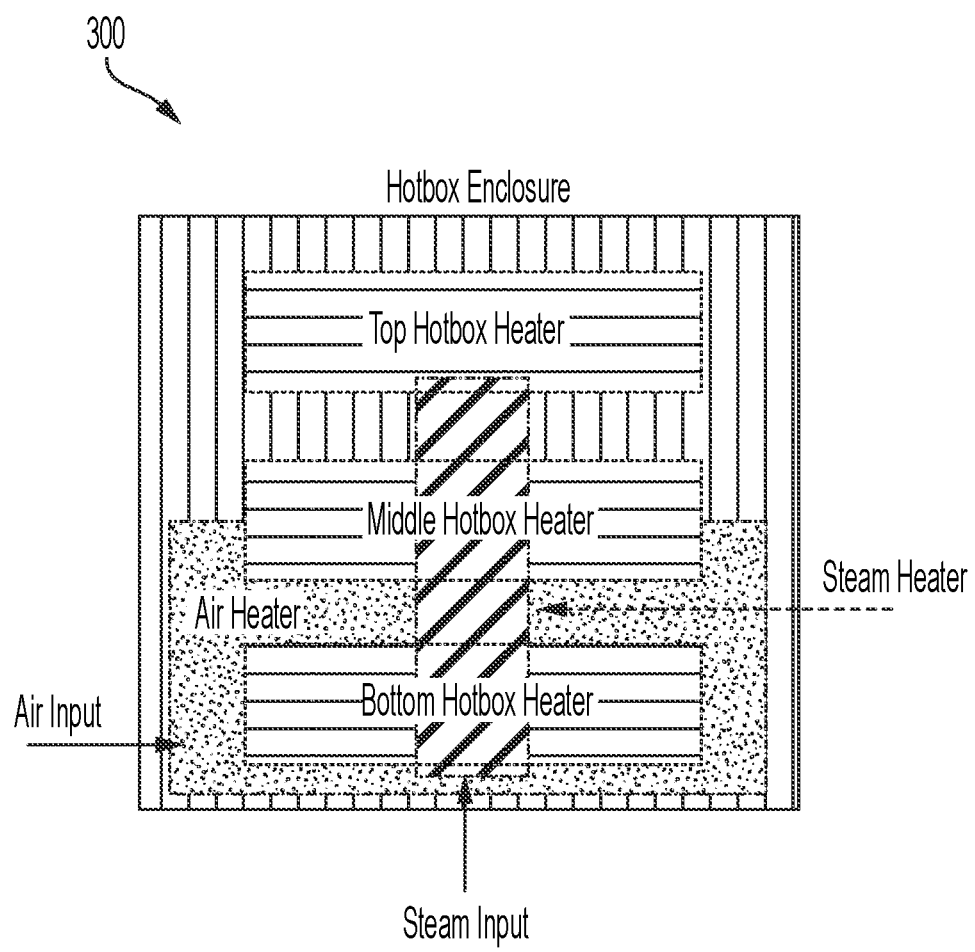
FIG. 3 illustrates an example heater configuration according to an example embodiment of the present invention.

Heater power estimator 217 can be based on historical data. For example, a curve fitting approach is used to estimate total heater power at different segment power level. If historical data is unavailable, total maximum heater power could be used as the baseline. Heater power estimator 217 accounts for the total number of operational heaters in the SOEC system and in case of failures the estimated power is adjusted. In an example configuration, there can be a total of five heaters within each SOEC system, including an air heater, top/middle/bottom hotbox heater, and steam heater. In another example configuration, the SOEC can further included an internal or external vaporizer. SOEC cells are operating at high temperatures, and heat sources are therefore needed to reach the desired temperature. FIG. 3 illustrates an example heater configuration 300 according to an example embodiment of the present invention.

Returning to FIG. 2, constant reserved power 218 is the reserved power that is used to take account of the required power for balance of plant (BOP) components and to provide a safety margin. The higher constant reserved power 218 value is set, the more conservative the performance is achieved.

Composition calculator 219 receives available steam flow limit 212 and requested hydrogen production 213 and calculates the maximum possible segment current that is supplied to one or more power modules 220.

Power modules 220 receive the segment power setpoint and regulate the segment power readback by adjusting the segment current command. Power modules 220 is used as segment voltages may be unknown and can be changed at different current command. The segment current command is always positive and lower than the maximum possible current calculated by composition calculator 219.

Higher hydrogen production is expected at higher hotbox segment current, and lower hydrogen production is expected at lower hotbox segment current. In the various embodiments, one or more safety alarms related to the power management controller can be implemented. Example alarms include:

Available power low stop alarm: This alarm monitors the power consumption and in case of a very low value (not enough to power BOP components), power management controller 200 triggers a stop alarm.

Available power violation ramp alarm: This alarm monitors the power consumption and in case of a violation, power management controller 200 triggers a ramp alarm (i.e., forces the power to be reduced).

Available steam violation ramp alarm: This alarm monitors the steam consumption and in case of a violation, power management controller 200 triggers a ramp alarm (i.e., forces the steam flow to be reduced).

In order to accommodate high penetration of renewables in the power grid, electrolyzers can be configured to store the excess energy and generate clean hydrogen from the excess energy. Generated hydrogen can be used at a later time (e.g., stored for later use) to generate electricity or used directly in other applications.

Figure 4:
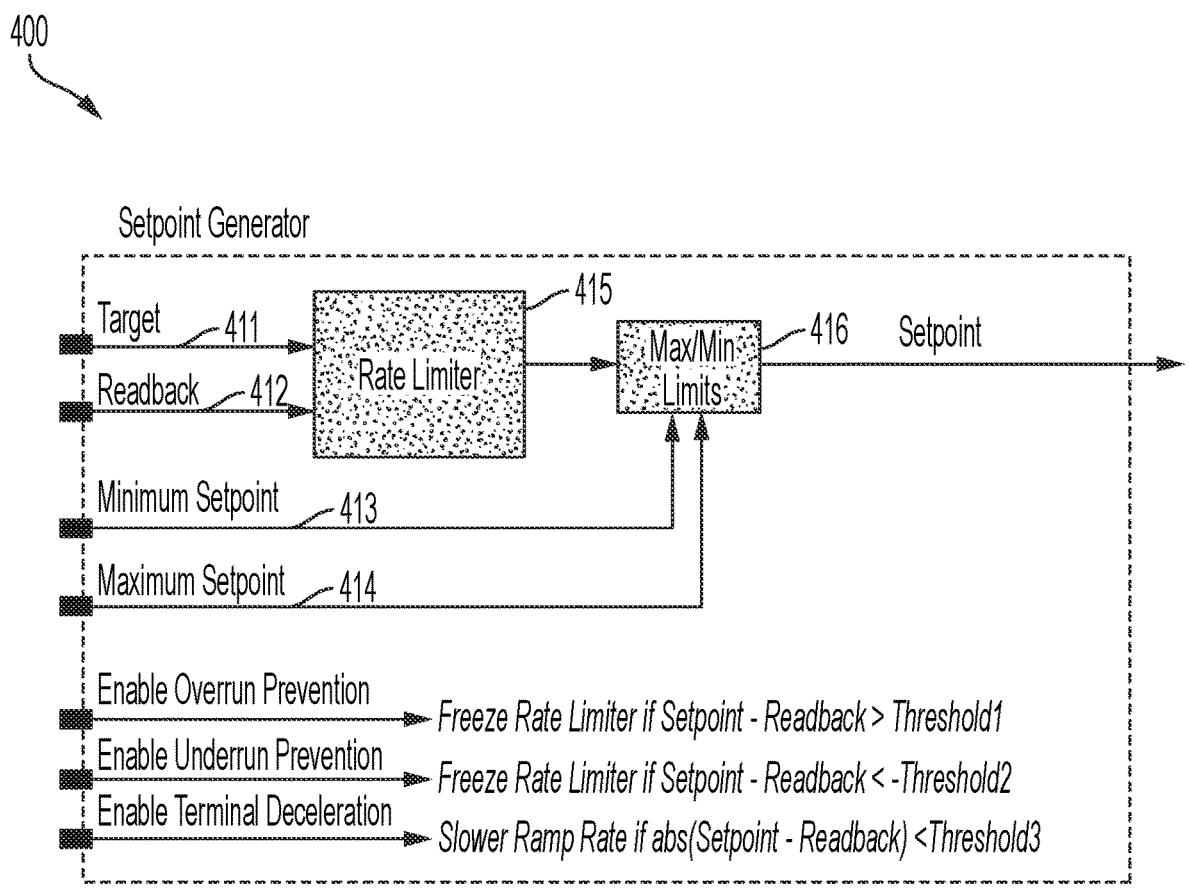
FIG. 4 is a setpoint generator for a heater according to an example embodiment of the present invention.

FIG. 4 is a setpoint generator 400 for a heater according to an example embodiment of the present invention. Setpoint generator 400 can be used for system heaters and vaporizers.

Setpoint generator 400 is configured to maintain an average temperature of the hotbox (e.g., hotbox 150) around the desired operating temperature (e.g., between 650° C. and 900° C.). In determining a setpoint command, a target operating temperature 411 can be set. In addition, one or more thermal sensors can be used to retrieve a readback temperature value 412. In turn, a heating ramp rate (e.g., ramp-up or ramp-down) is calculated at rate limiter 415. The heating ramp rate can be limited between minimum setpoint 413 and maximum setpoint value 414, at secondary limiter 416.

In operation, setpoint generator 400 is a controller configured to ramp the setpoint (e.g., from room temperature to target operating temperature of hotbox). In some configurations, setpoint generator 400 has features such as setpoint overrun prevention, setpoint underrun prevention, and terminal deceleration using respective thresholds. Each of these features can be utilized to guarantee the stability of hotbox temperature during ramping and steady state.

Accordingly, setpoint generator 400 is configured to maintain a uniform temperature or temperature range across the hotbox (e.g., hotbox 150) by reducing the temperature differences between different thermal sensor locations. Additionally, the heat ramp rate is regulated by controlling each heater power level. As a result, robustness against individual heater failure is achieved by independent heater control, and unstable thermal regions are prevented.

Figure 5:
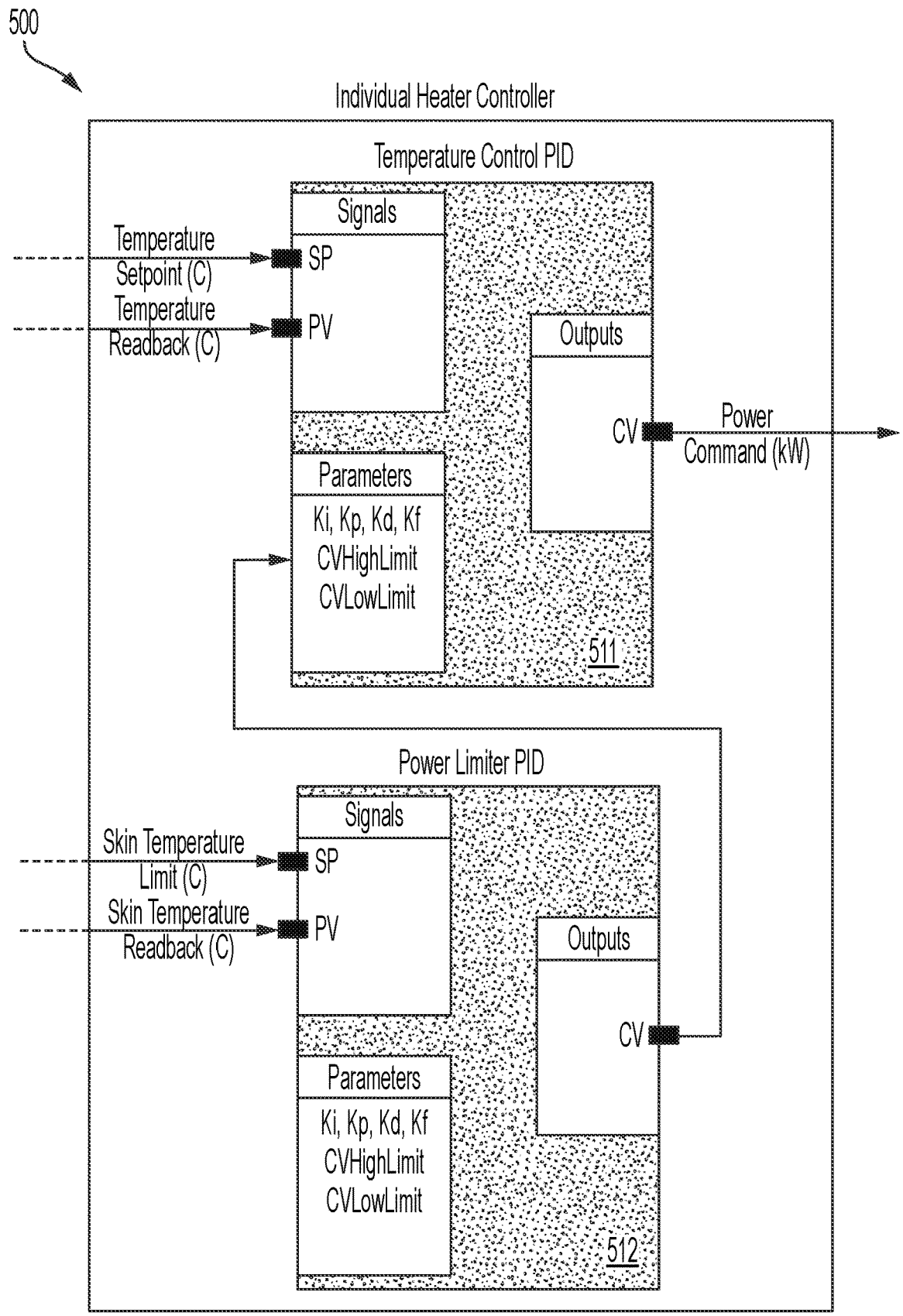
FIG. 5 illustrates an individual heater controller according to an example embodiment of the present invention.

FIG. 5 illustrates an individual heater controller 500 according to an example embodiment of the present invention. Individual heater controller 500 can be used for system heaters and vaporizers.

As illustrated in FIG. 5, individual heater controller 500 receives a generated temperature setpoint (e.g., from setpoint generator 400). In this manner, each individual heater can be configured to receive a generated setpoint.

Each heater controller 500 includes a temperature control module 511 (e.g., power PID, proportional-integral-derivative module) to achieve the desired temperature by generating power command. Each heater controller 500 further includes a power limiter module 512 (e.g., power limiter PID, proportional-integral-derivative module) to maintain the heater skin temperature below the manufacture recommended threshold by limiting power to the respective heater. The power limiter module 512 is continuously or periodically used to monitor the heater surface temperature using one or more thermal monitors.

The temperature readback supplied to temperature control module 511 can be determined for each respective heater. For an air heater, temperature readback is average hotbox temperature readback; for hotbox heaters, temperature readbacks are corresponding hotbox row temperature readbacks; and for steam heater, temperature readback is inlet steam temperature flowing into the hotbox. Using individual heater controller 500, each heater is coordinated to maintain hotbox average temperature around the desired operating point, providing uniform temperature across hotbox (e.g., hotbox 150) and reducing the temperature difference. Individual heater controller 500 is robust against single and multiple heater failures as other available heaters can be configured to compensate and reach the setpoint temperature.

Accordingly, individual heater controller 500 can control heater power with or without resistance information. Additionally, individual heater controller 500 limits power usage to avoid violation of heater's skin temperature limit and extend heater lifetime. As a result, individual heater controller 500 avoids violation of each heater's maximum current/voltage limits to extend heater lifetime.

Figure 6:
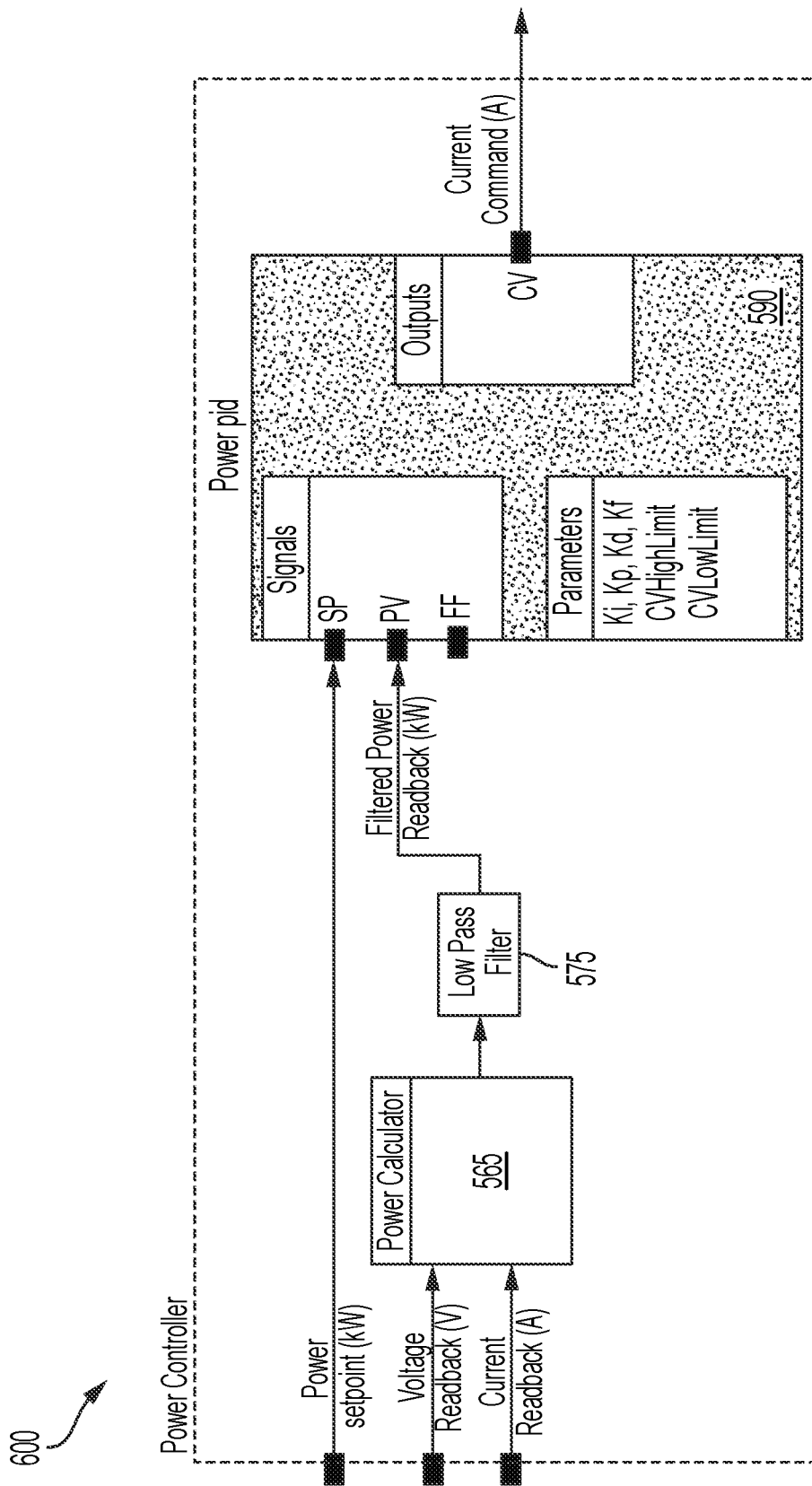
FIG. 6 illustrates an individual power controller according to an example embodiment of the present invention.

FIG. 6 illustrates an individual power controller 600 according to an example embodiment of the present invention. Individual power controller 600 can be used for system heaters and vaporizers.

Figure 7:
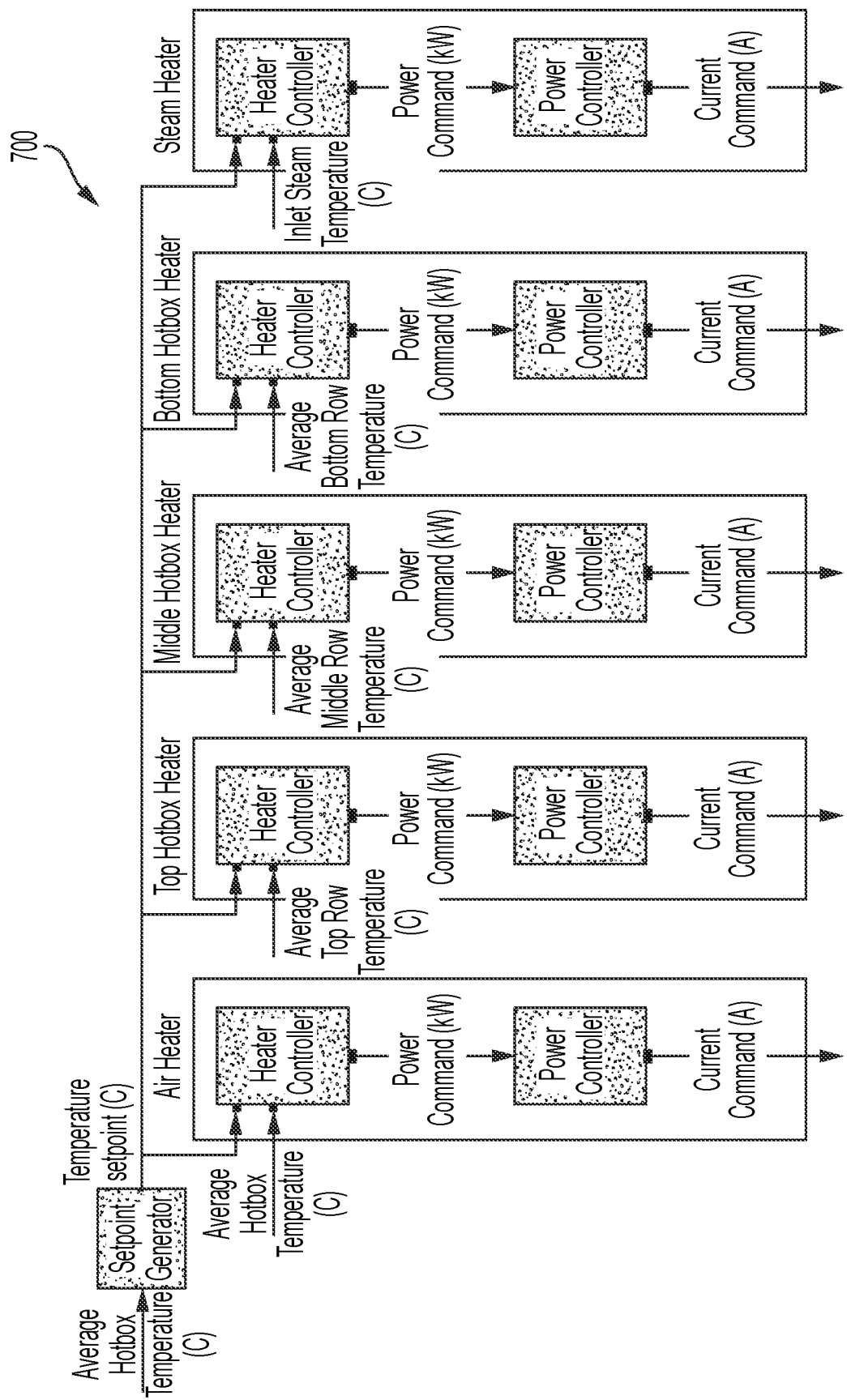
FIG. 7 illustrates setpoint generator coupled to respective heaters according to an example embodiment of the present invention.

In operation, an information exchange occurs within each respective heater between individual heater controller 500 and individual power controller 600, as shown in FIG. 7. For example, power module 590 (e.g., power PID, proportional-integral-derivative module) receives a power setpoint (i.e., power command), as discussed above. Furthermore, voltage and current sensors are used to calculate the readback (i.e., feedback) using power calculator 565. The voltage and current readback can be filtered by low-pass filter 575 and supplied to power module 590 to calculate the appropriate current command for respective heaters.

The power command from the temperature control module 511 is sent to power module 590. Individual power controller 600 for each heater is used to command current to DCDCs (i.e., DC to DC converter) to achieve the desired power level. In some configurations, there are two modes of operation in individual power controller 600 for commanding current and voltage to DCDCs. First, an estimated resistance mode in which heater resistance is measured at the time of heater installation. Second, a power mode in which heater resistance is not known.

FIG. 7 illustrates a setpoint generator (e.g., 400) coupled to respective heaters according to an example embodiment of the present invention. Each respective heater includes individual heater controller (e.g., 500) and individual power controller (e.g., 600).

As described herein, heater power is dynamically controlled using this multi-zone control approach to guarantee both system level and individual heater control objectives. In some configurations, heaters can be disabled during controlled shutdown.

The embodiments provide configurations of the controller associated with heating subsystems of the SOEC to dynamically control each individual heater and coordinate them base on system operation. Heat is generally consumed in the electrolyzer, for instance, during heat up or during low current operation.

In the various embodiments, one or more safety alarms related to monitoring hotbox temperature can be implemented. Example alarms include:
High horbox max temperature stop alarm: This alarm monitors SOEC hotbox maximum temperature. In case of high temperatures, the controller triggers a stop alarm.
High hotbox average temperature stop alarm: This alarm monitors SOEC hotbox average temperature. In case of high temperatures, the controller triggers a stop alarm.
Low hotbox average temperature stop alarm: This alarm monitors SOEC hotbox average temperature. In case of low temperatures, the controller triggers a stop alarm.

In the various embodiments, one or more safety alarms related to monitoring individual heaters can be implemented. Example alarms include:
High heaters skin temperature stop alarm: This alarm monitors heater's skin temperature. In case of high temperatures, the controller triggers a stop alarm.
Heater instrumentation failure stop alarm This alarm monitors heater's instruments. In case of major failure, the controller triggers a stop alarm.

Accordingly, the controllers associated with the heating subsystems of SOEC systems generate control/process signals that are sent to the DCDC converters that provide variable power to each heater in the hotbox (e.g., hotbox 150). The controllers enable maintaining hotbox temperature against disturbances, coordinating heaters power, and maintaining heaters operational limits. The embodiments are fault-tolerant and responsive to multiple heaters failures.

Figure 8:
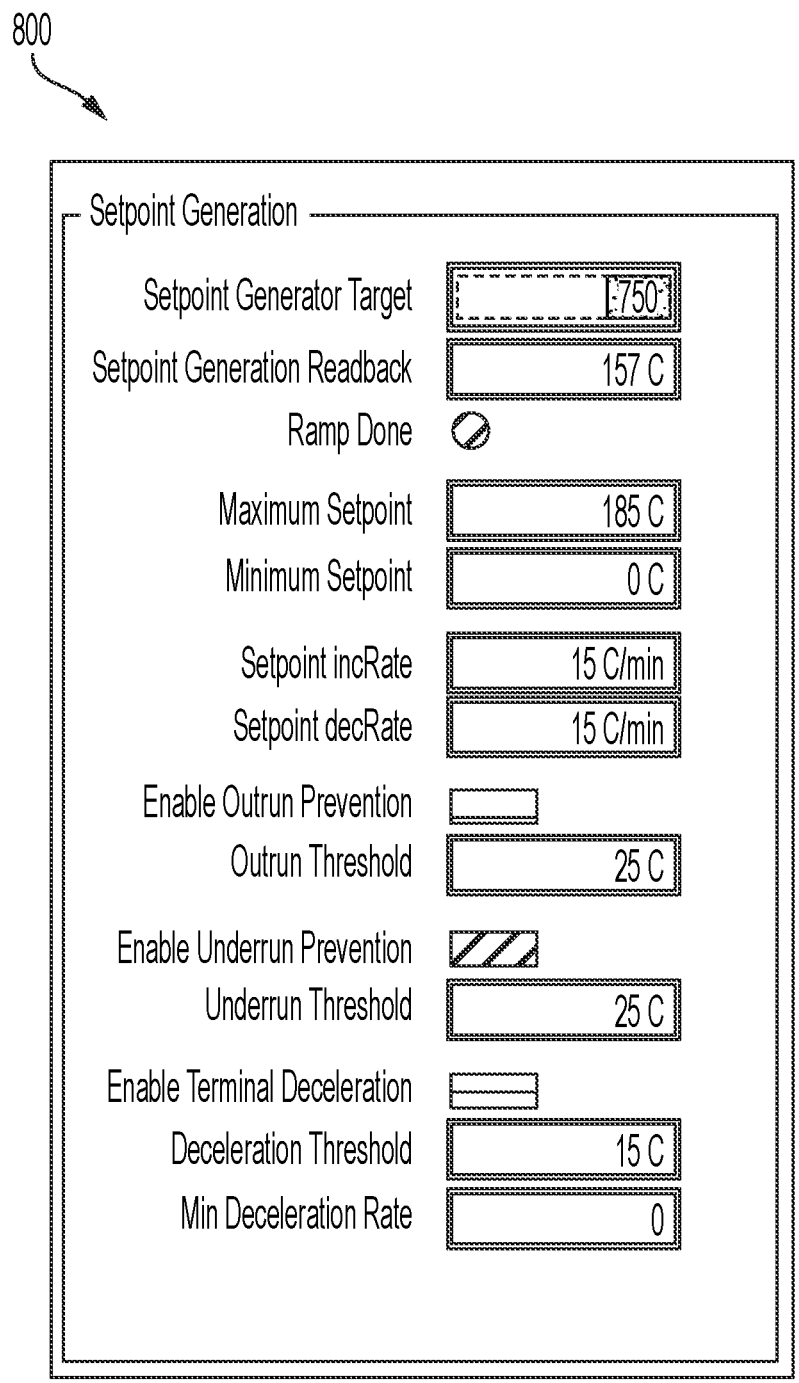
FIG. 8 illustrates a user control panel according to an example embodiment of the present invention.

FIG. 8 illustrates a user control panel 800 according to an example embodiment of the present invention. Here, the setpoint generator for heaters is shown, for example.

As discussed above, multiple heaters may be used within the SOEC system. In an example configuration, there can be a total of five heaters within each SOEC system, including an air heater, top/middle/bottom hotbox heater, and steam heater. Additionally, in another embodiment, an internal or external vaporizer can be added to supply steam output to the hotbox (e.g., hotbox 150). For example, water is input to an internal steam subsystem and is converted to steam using one or more vaporizers. Steam flow can be controlled indirectly by regulating water flow using one or more valves (e.g., electric valves) along the input water line and upstream from the vaporizer.

Internal steam module can operate in several states.

For example, the OFF STATE. In the OFF STATE, the controller commands a water valve and/or a mass flow controller to remain closed and disable the vaporizer. Thus, no steam is generated when controller is in OFF STATE.

For example, the HEAT UP STATE: In HEAT UP STATE, the water valve and/or mass flow controller remain closed, but the controller enables the vaporizer. Temperature control PID is used to heat up the vaporizer by sending a power command to the power controller. The vaporizer skin temperature readback is used as a process variable to heat up the vaporizer.

For example, the CONTROLLED FLOW STATE. In the CONTROLLED FLOW STATE, the controller opens the water valve and/or mass flow controller to receive water flow command. The water flow command is calculated based on the required steam flow needed for operation of electrolyzer. Once steam temperature is high enough (e.g., greater than 150° C.), temperature control PID process variable changes from vaporizer skin temperature to steam temperature readback.

In operation, the controller transitions from HEAT UP STATE to CONTROLLED FLOW STATE occurs when the vaporizer is at heat up temperature. This transition guarantees that vaporizer is hot enough before water is started to flow. Temperature control PID is responsible for both vaporizer heat up and steam temperature control during vaporizer heat up, water flow ramp, and steady state operation.

Switching the temperature control PID process variable has the following advantages. During initial heat up, vaporizer skin temperature is used for heat up. During transition to controlled flow state, still vaporizer skin temperature is used since steam temperature might initially increase with delay (as more water flows steam temperature increases). As a result, vaporizer over temperature can be avoided by ignoring steam temperature initially. Once steam is hot enough, steam temperature is controlled directly to reduce the power consumption and regulate steam temperature.

Accordingly, steam temperature can be controlled at the desired setpoint. Steam flow can be controlled by adjusting input liquid water flow. Additionally, high temperature and stable steam flow is supplied during steam flow ramp and steady state operations.

The controller associated with the internal steam subsystem of SOEC (e.g., controllers 400, 500, 600) coordinate different equipment of this subsystem by commanding water valves, water mass flow controllers, and vaporizer DCDC converters. It guarantees to supply high temperature and stable steam flow during steam flow ramps and steady state flows. The embodiments are not limited to any particular vaporizer.

In the various embodiments, one or more safety alarms related to monitoring internal steam modules can be implemented. Example alarms include:
High vaporizer skin temperature stop/warning alarm: This alarm monitors vaporizer maximum skin temperature. In case of high temperatures, the developed controller triggers stop/warning alarm.

Vaporizer heat up time out stop alarm: This alarm monitors the vaporizer initial heat up time. In case of significant delay in vaporizer heat up, the developed controller triggers a stop alarm.

High water readback deviation stop alarm: This alarm monitors water mass flow controller response. In case of high flow deviation from setpoint, the developed controller triggers a stop alarm.

Low steam temperature stop alarm: This alarm monitors steam temperature. In case of low steam temperature, the developed controller triggers a stop alarm.

Steam module instrumentation failure alarm: This alarm monitors steam module instrumentation. In case of major failure, the developed controller triggers a stop alarm.

As will be readily understood, hydrogen produced by SOEC systems can readily be supplied to a variety of applications, such as AlwaysON microgrids for businesses and communities, hydrogen fuel cell vehicles, hydrogen injection into natural gas pipelines, and numerous other applications.

For renewable hydrogen production, the solid oxide electrolysis system could be integrated with renewable resources such as solar, wind, and hydro. Renewable green hydrogen production requires ramping up and down in hydrogen production rate to meet the available renewable electricity.

Generated electricity from these intermittent natural sources is not always available at constant rate. As a result, integration of solid oxide electrolyzer system with renewable (e.g., zero-carbon) electric resources requires thermal management to keep SOEC system hot and ready to produce hydrogen while power is limited at the customer site and quickly switch to hydrogen production when power becomes available. Keeping the system hot and avoiding thermal cycle while power becomes limited or becomes available is necessary to lower degradation of different components in the SOEC system and increases component and system lifetime. Therefore, the embodiments include a hot standby mode of operation where power required to keep the SOEC system hot and ready to produce hydrogen is minimized and flows responsible for the increased lifespan are minimized. Also, it is important to have a sequence of steps to enter to the hot standby from hydrogen production state and exit the hot standby to hydrogen production state while ensuring the appropriate operation of all the components in the system.

The hot standby mode turns off the steam module to zero the power required for the vaporizer to produce steam at a desired temperature (required for internally generated steam units). Further, the hot standby forces the external fresh hydrogen (to keep fuel electrode from oxidation) at the minimum rate that can be maintained by the hydrogen mass flow controller. The air flow rate is minimized, but not fully stopped, to prevent stack and air heaters from burning out.

For systems that operate at sites with limited available power at some hours during the day (e.g., renewable electricity resources), thermal cycle of the system is prevented at the beginning and at the end of limited available power time periods. The power required to hold system hot and ready to produce hydrogen is minimized while providing minimum flows required to not degrade the system and its components. The hot standby mode of operation and sequences to enter/exit from/to hydrogen production state guarantees all the required flows to have smooth transition to/from hydrogen production.

The solid oxide electrolyzer system is a highly efficient high temperature electrolyzer that uses electricity to split steam into hydrogen as the main product and oxygen as the byproduct. As countries commit to net-zero emissions goals, the need for hydrogen is increasing. Solid oxide electrolyzer technology plays a competitive role in a broad variety of hydrogen production scenarios, including utilizing excess renewables, integrating with large-scale sources of heat from industrial processes and nuclear reactors.

The following steps are proposed to exit from hydrogen generation state and enter hot standby mode. First, ramping down from full hydrogen production to zero hydrogen production. Second, opening the DCDC contactors. Third, stopping steam module which stops both water flow and vaporizer in internally generated steam units and stops steam in externally provided steam units. Fourth, reducing air in several steps to minimum air that can be maintained by air blower. Lastly, reducing fresh hydrogen to minimum flow rate that can be maintained by hydrogen mass flow controller.

With the proposed sequence of steps and adjustment, minimum power to keep the unit hot and ready to generate hydrogen can be achieved. This minimum power is mainly consumed in heaters to compensate heat loss from the hotbox enclosure to the atmosphere. Also smooth module voltages in the transition from hydrogen generation state to hot standby state and stable voltages in the hot standby state enhance the reliability of the sequence of steps and operating conditions in the hot standby mode.

The following steps are to exit from hot standby state and enter hydrogen production state. First, increasing fresh hydrogen to desired flow setpoint for entering the hydrogen production state. Second, increasing air in several steps to desired flow setpoint for entering the hydrogen production state. Third, starting the steam module which starts both water flow and vaporizer heat up process in internally generated steam units and starts steam in externally provided steam units. Fourth, closing the DCDC contactors. Lastly, ramping up from zero hydrogen production to full hydrogen production.

The hot standby mode and sequence of steps to transition to/from that state prevent consecutive thermal cycles (increase lifetime of stacks) and long preparation time to get back to hydrogen production state for systems that operate at sites with limited available power at some hours during the day (renewable electricity resources). It also minimizes both power required and flow required to keep unit hot (at desired temperature) and ready to produce hydrogen.

Although the various controllers described herein (e.g., 200, 400, 500, 600) are shown separately, the controllers may be separate or integrated into a single controller. The various controllers described herein can be embedded controllers within the system enclosure adjacent to hotbox 150. The various controllers described herein can include a non-transitory memory and one or more processors configured to execute the instructions and functions described herein.

It will be apparent to those skilled in the art that various modifications and variations can be made in the power management control of the present invention without departing from the spirit or scope of the invention. Thus, it is intended that the present invention cover the modifications and variations of this invention provided they come within the scope of the appended claims and their equivalents.

What is claimed is:

1. A solid oxide electrolyzer cell (SOEC) system, comprising:
a hotbox having an air input and a steam input;
solid oxide electrolyzer cells located in the hotbox;

a plurality of heaters located in the hotbox, wherein the plurality of heaters comprise an air heater configured to heat air provided from the air input into the hotbox, a steam heater configured to heat steam provided from the steam input into the hotbox, and hotbox heaters configured to heat the hotbox; and a controller configured to: receive a target operating temperature; receive a readback temperature value; and output a plurality of temperature setpoint commands in which a temperature setpoint command is output to each of the plurality of heaters, wherein the hotbox heaters include a top hotbox heater, a bottom hotbox heater, and a middle hotbox heater located between the top hotbox heater and the bottom hotbox heater, and wherein the hotbox heaters are arranged in a stack.

2. The SOEC system according to claim 1, wherein the system further comprises a vaporizer, and
a setpoint command of the plurality of temperature setpoint commands is output to the vaporizer.

3. The SOEC system according to claim 1, wherein each heater of the plurality of heaters includes a heater controller and a power controller.

4. The SOEC system according to claim 1, wherein the controller is configured to ramp a temperature of each of the hotbox heaters from a room temperature to the target operating temperature of each of the hotbox heaters.

5. The SOEC system according to claim 1, wherein the controller has a state machine to coordinate components related to an internal steam module, the controller having an off state, a heatup state, and a controlled flow state.

6. The SOEC system according to claim 1, wherein the controller is configured to output the plurality of temperature setpoint commands in which a different temperature setpoint command is output to each of the plurality of heaters, and at least two of the hotbox heaters are set to different operating temperatures from each other.

7. The SOEC system according to claim 1, wherein the air heater and the steam heater are located adjacent to both the middle hotbox heater and the bottom hotbox heater, and the top hotbox heater is spaced away from the air heater and the steam heater.

8. A method of operating the SOEC system of claim 1, comprising:
providing steam and the hydrogen from a gas distribution module to the hotbox through the steam input;
applying a voltage to the SOEC cells to generate a product gas comprising hydrogen and steam;
suppling the product gas to a product manifold during normal operation of the SOEC system; and
supplying the product gas to a vent manifold when a fault occurs.

9. A method of controlling a solid oxide electrolyzer cell (SOEC) system, the method comprising:
receiving a target operating temperature;
receiving a readback temperature value; and
outputting a plurality of different temperature setpoint commands to a plurality of heaters of the SOEC system, such that each heater of the plurality of heaters receives its respective temperature setpoint command of the plurality of different temperature setpoint commands,
wherein the plurality of heaters comprise:
an air heater which heats air provided to the SOEC system;
a steam heater which heats steam provided to the SOEC system; and
hotbox heaters which heat a hotbox of the SOEC system.

10. The method according to claim 9, wherein the SOEC system further comprises a vaporizer, and an additional temperature setpoint command of the plurality of different temperature setpoint commands is output to the vaporizer.

11. The method according to claim 9, wherein each heater of the plurality of heaters includes a heater controller and a power controller.

12. The method according to claim 9, further comprising ramping a temperature of the plurality of heaters from a room temperature to the target operating temperature.

13. The method according to claim 9, wherein a controller of the SOEC system has a state machine to coordinate components related to an internal steam module of the SOEC system, the controller having an off state, a heatup state, and a controlled flow state.

14. The method according to claim 9, wherein the hotbox heaters comprise a top hotbox heater, a bottom hotbox heater, and a middle hotbox heater located between the top hotbox heater and the bottom hotbox heater, and wherein the hotbox heaters are arranged in a stack.

15. The method according to claim 14, wherein the air heater and the steam heater are located adjacent to both the middle hotbox heater and the bottom hotbox heater, and the top hotbox heater is spaced away from the air heater and the steam heater.

16. The method according to claim 9, wherein at least two of the hotbox heaters are set to different operating temperatures from each other.

* * * * *